United States Patent [19]
Biemont

[11] Patent Number: 5,848,491
[45] Date of Patent: Dec. 15, 1998

[54] SLING-FITTING EQUIPMENT FOR AN ASSAULT RIFLE OF THE AR15-M16 FIREARM FAMILY AND EQUIVALENT MODELS, AND AN ASSEMBLY FOR INSTALLING THE EQUIPMENT

[75] Inventor: Paul Biemont, 40, rue Pierre Girard, 14000 Caen, France

[73] Assignee: Paul Biemont, Buron-Cairon, France

[21] Appl. No.: 896,104

[22] Filed: Jul. 17, 1997

[51] Int. Cl.⁶ .................................................. F41C 23/02
[52] U.S. Cl. ................................................. 42/85; 42/106
[58] Field of Search ....................... 42/85, 106; 224/150, 224/149, 913; 24/2.5

[56] References Cited

U.S. PATENT DOCUMENTS

| | | | |
|---|---|---|---|
| 4,555,051 | 11/1985 | Johnson | 224/150 |
| 4,571,872 | 2/1986 | Johnson | 42/85 |
| 4,665,641 | 5/1987 | Llames | 42/85 |
| 4,691,852 | 9/1987 | Phelps | 224/150 |
| 4,823,998 | 4/1989 | Johnson | 224/150 |
| 5,075,996 | 12/1991 | Llames | 42/85 |
| 5,692,654 | 12/1997 | Bell | 224/150 |

FOREIGN PATENT DOCUMENTS

PCT/US84/01094  1/1985  WIPO.

*Primary Examiner*—Charles T. Jordan
*Assistant Examiner*—Meena Chelliah
*Attorney, Agent, or Firm*—Fulbright & Jaworski L.L.P.

[57] ABSTRACT

The equipment comprises a rear fixing member with a peg whose head is pierced to receive a sling swivel, the head bearing against the outside and the top of the butt, its shank passing into the butt and being retained, free to rotate, in a spacer carried by the rear end of the tube supporting the butt, between the tube and the buttplate, the equipment also comprises a front fixing member fixed to the rear limb of the frontsight support, and formed by ahead pierced by a hole to receive the other sling swivel.

4 Claims, 5 Drawing Sheets

SLING-FITTING EQUIPMENT FOR AN ASSAULT RIFLE OF THE AR15-M16 FIREARM FAMILY AND EQUIVALENT MODELS, AND AN ASSEMBLY FOR INSTALLING THE EQUIPMENT

FIELD OF THE INVENTION

The present invention relates to sling-fitting equipment for an assault rifle of the AR15-M16 firearm family, and also to an assembly for installing the equipment.

More particularly, the invention relates to sling-fitting equipment for an assault rifle of the AR15-M16 firearm family, comprising:

- a rear fixing member on the butt and a front fixing member on the barrel; the frontsight being carried by a quadrilateral support fixed to the barrel;
- the butt being engaged on a tube which is screwed to the body of the firearm, and being fixed to the tube by a screw passing through the buttplate and the spacer.

BACKGROUND OF THE INVENTION

At present, assault rifles of the AR15-M16 family or equivalent firearms include a sling fixed firstly beneath the frontsight support at the front of the rifle, and secondly to a swivel fixed at the bottom rear end of the butt.

Nevertheless, a sling installed in this way is very impractical since it is ill-suited to the balance of the firearm which always tends to roll over and turn upside-down relative to the natural carrying position.

OBJECTS AND SUMMARY OF THE INVENTION

An object of the present invention is to remedy those drawbacks and to provide equipment for such an assault rifle making it possible for it to receive a sling that holds the firearm in position. Another object of the invention is to provide a set of templates for drilling the firearm at appropriate locations for installing the sling-fitting equipment.

To this end, the invention relates to equipment of the above-defined type, wherein:

the rear fixing member comprises:
- a peg having a head pierced to receive a sling-engaging loop;
- the head bearing against the butt on top and on the outside; and
- the peg having a shank passing into the butt and being retained, free to rotate, in a retaining washer or spacer carried by the rear end of the butt-support tube, between the tube and the buttplate;
- the front fixing member being a peg fixed to the rear limb of the support for the frontsight, between the frontsight and the barrel, said member being constituted by a head having a hole for receiving the other sling swivel, and a threaded shank passing through the rear limb of the frontsight support, and receiving a nut secured by a split pin.

The equipment of the invention is particularly practical; the sling is above the firearm so when the firearm is carried by the sling it does not tend to roll over about the axis passing through the two sling swivels.

The sling can be fixed to and removed from these swivels quickly.

The sling holds the firearm in particularly simple and reliable manner; the fixing points for the two ends of the sling are particularly reliable since they are the frontsight support and the rear end of the butt-carrying tube.

These swivels are free to rotate, so they do not jam if the sling becomes twisted, thereby guaranteeing great freedom of movement without the swivels being fragile or running any risk of becoming unscrewed.

Importantly, the invention also relates to means for installing such swivels on preexisting firearms, i.e. for retrofitting such swivels.

To this end, the invention provides an assembly comprising:

an L-shaped rear template having one limb that fits over the rear of the butt and another limb inclined at less than 90° relative to the first at the same slope as the buttplate and provided with a hole coinciding with the tube so as to enable it to be installed and fixed against the tube in the place of the buttplate;

the first limb having a hole lined with a bushing through the butt can be drilled to enable it to receive the shank of the peg, the rear template being fixed to the tube by a tommy-bar screw.

The invention also provides an assembly comprising an L-shaped front template, matching the shape of the frontsight support for its top portion that receives the frontsight and its other limb that slopes like the rear portion of the frontsight support, said template being provided in its first limb with a wing screw for engaging in the tapped hole for the frontsight once the frontsight has been removed, the rear limb including a drilling bushing through which a hole can be drilled in the rear limb to enable the sling swivel peg to be installed.

These two drilling templates can be put very easily and reliably into place. The rear template takes up an accurate position on the rear of the butt, in spite of the very special shape of a butt. Installing the rear template is easy and it is held particularly reliably so as to enable drilling to be performed accurately to provide the peg-receiving orifice in the butt.

The template for drilling the frontsight support is just as simple and reliable. It is put into place very easily once the frontsight has been removed; a tommy-bar or wing screw belonging to the front drilling template is screwed into the tapped hole for the frontsight so that the front template is well secured to the frontsight support. Drilling can then be performed accurately through the rear limb of the frontsight support. Once the template has been removed, it is very simple to install the front peg, and likewise the rear peg. It then suffices, where appropriate, to attach the sling swivels.

The drilling templates are generally made of aluminum with treated steel drilling bushings enabling the regimental gunsmith to install the fixing members on firearms merely by drilling holes with an ordinary drill. There is no need to return the firearms to maintenance depots or to the manufacturers.

BRIEF DESCRIPTION OF THE DRAWINGS

The present invention is described below in greater detail with reference to the accompanying drawings, in which.

MORE DETAILED DESCRIPTION

Figure 1:
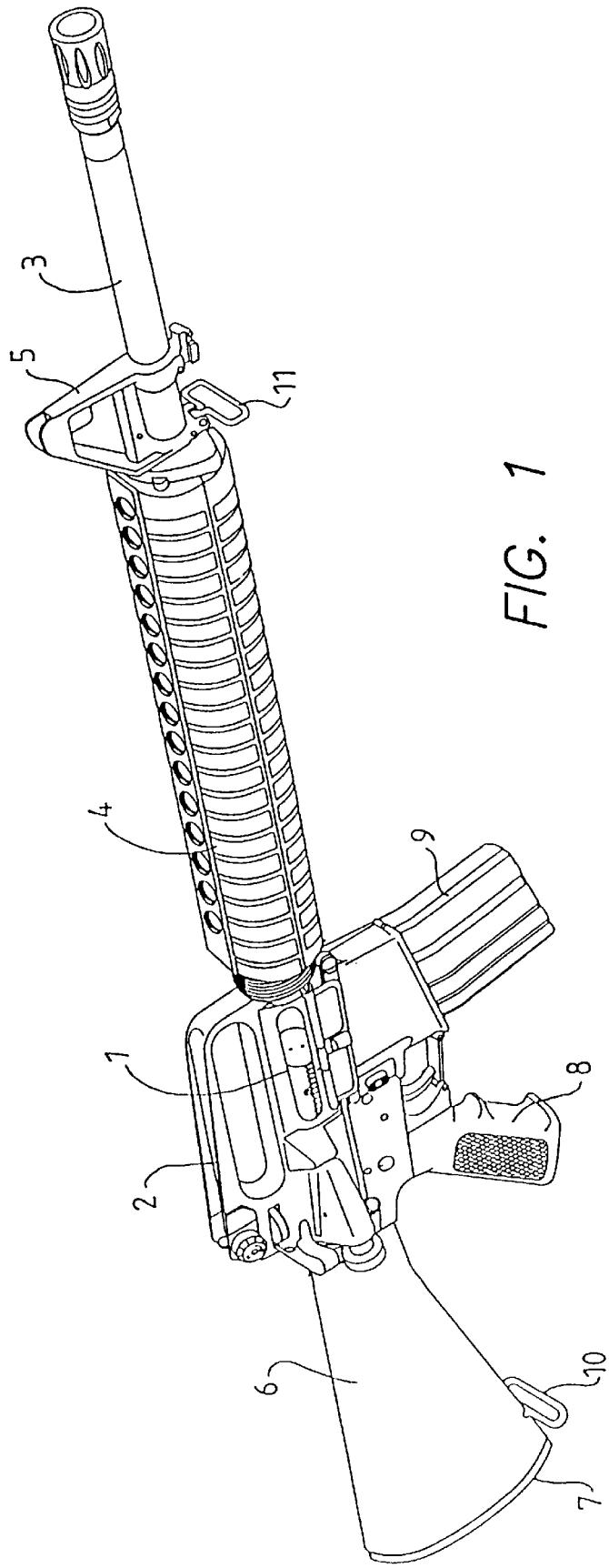
FIG. 1 is a diagrammatic perspective view of an M16A2 assault rifle suitable for receiving the sling-fitting equipment of the invention.

With reference to FIG. 1, the invention is designed to be fitted to an assault rifle of the AR15-M16 firearm family or to equivalent models, said means serving to attach a sling.

The rifle comprises a body 1 provided with a handle 2. The body is extended forwards by the barrel 3 which is partially hidden under a thermal protection jacket 4. In front of the jacket there is a frontsight support 5 for the frontsight which is not shown.

The body 1 is provided towards the rear with a butt 6 terminated by a buttplate 7.

On the underside of the body 1 there is a pistol grip 8.

The figure also shows the magazine 9.

Other details of the firearm that are unimportant for implementing the present invention are not described.

On manufacture, this firearm includes a rear sling swivel 10 and a front sling swivel 11. The rear swivel 10 is provided at the rear bottom end of the butt 6 while the front swivel 11 is under the foresight support 5. It should be observed that the foresight support 5 is fixed to the barrel 3 merely by two conical pins.

Figure 2:
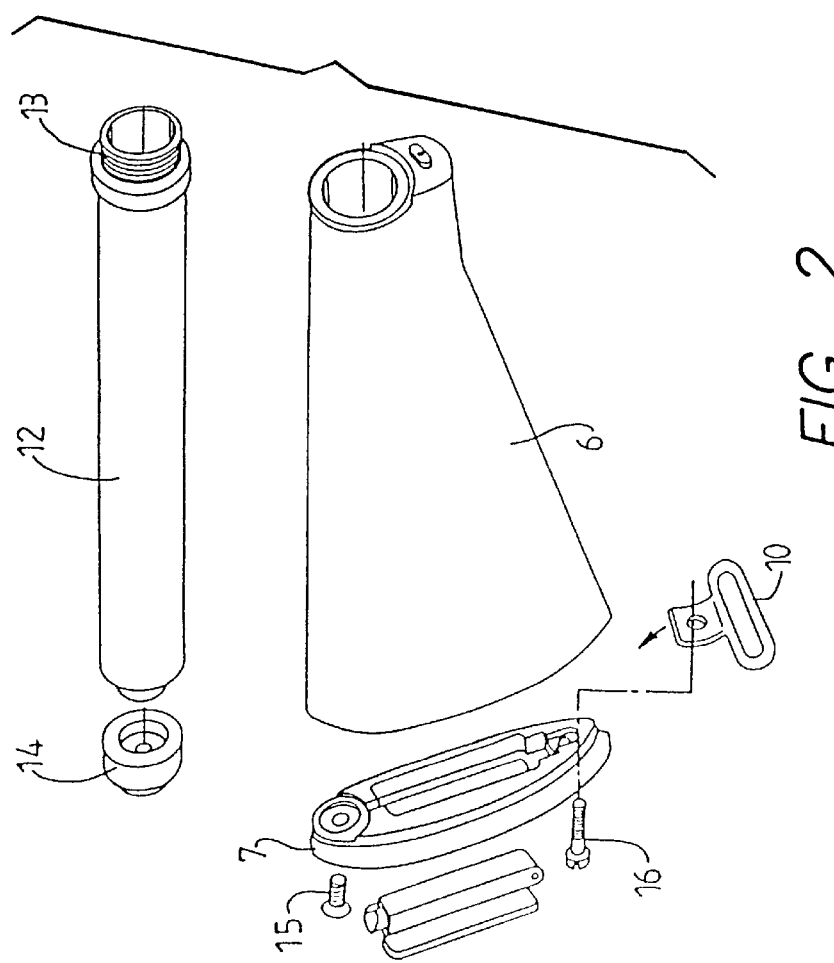
FIG. 2 is an exploded fragmentary view of the butt, of the buttplate and the butt support tube, and of the spacer.

More precisely, in FIG. 2, the butt 6 is carried by a tube 12 whose front end 13 is screwed into the body 1 of the firearm and whose rear end receives a spacer 14; the assembly is clamped by the buttplate 7 using a screw 15 that passes through the spacer 14 in the rear end of the tube 12. Another screw 16 serves to fix the buttplate to the butt 6, in the bottom portion thereof and passing through a tapped portion of the swivel 10.

Figure 3:
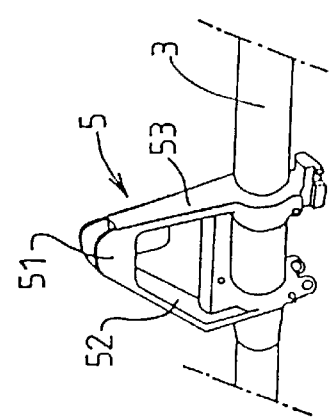
FIG. 3 is a perspective view of the portion of the barrel fitted with the frontsight support.

FIG. 3 shows separately the foresight support 5 carried by the barrel 3. In this figure, the sling swivel 11 has been removed.

The frontsight support 5 comprises a top limb 51 carrying the frontsight, a rear limb 52 and a front limb 53. Each of the limbs 52 and 53 is terminated by a loop which fits over the barrel 3.

The limbs 52, 53, and 51 give the frontsight support the shape of a quadrilateral having a sloping side constituted by the rear limb 52.

According to the invention, the rifle equipment comprises a rear fixing member and a front fixing member. The rear fixing member and the way in which it is installed are described below with reference to FIGS. 4 and 5.

Figure 4:
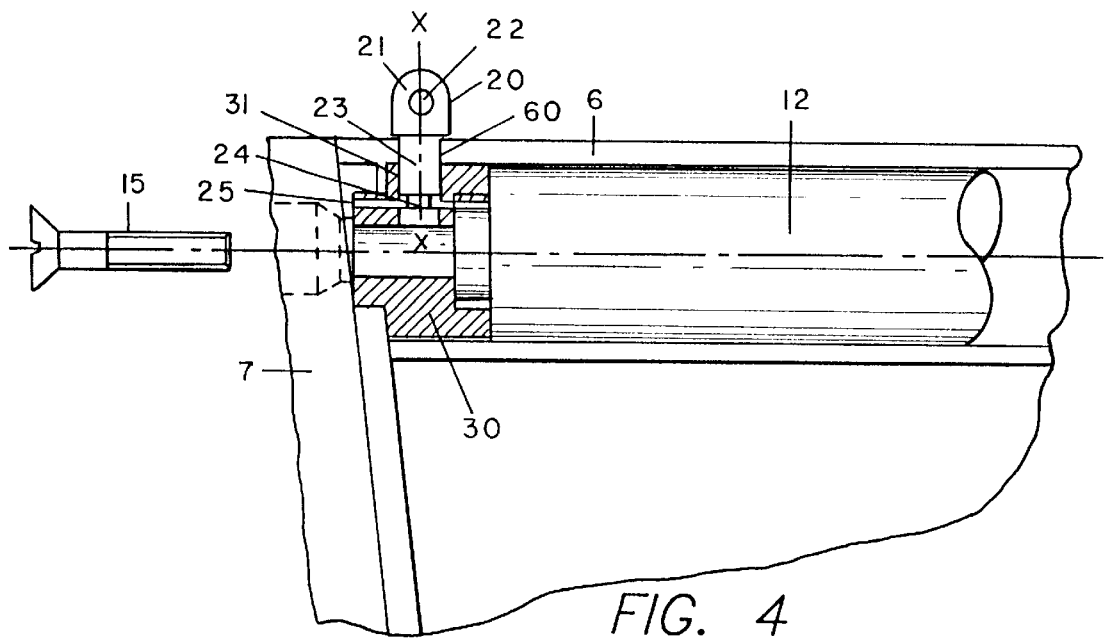
FIG. 4 is a diagrammatic view of the rear end of the butt after the lower sling swivel peg has been installed.

FIG. 4 shows only the rear top portion of the butt 6 with the tube 12 and the buttplate 7, in association with a rear fixing member 20 constituted by a head 21 pierced by a hole 22 and bearing against the outside surface of the butt 6. The head 21 is extended by a shank 23 of smaller diameter which penetrates into the butt 6 via a hole 60 and is received in the hole 31 of a retaining spacer 30 mounted at the rear end of the tube 12. The assembly comprising the tube 12, the spacer 30, and the buttplate 7 is held together by a screw 15.

The shank 23 is cylindrical in shape and includes a groove 24 in which two pins 25 come to bear on either side and are represented merely by a line. The two pins pass through the groove 24 from side to side, thereby retaining it, thus enabling the peg 20 to rotate freely about its own axis while continuing to be held by the spacer 30.

Since the pins 25 are placed in the spacer 30 and their orifices are closed by the buttplate 7, the pins 25 cannot escape from their respective housings.

Figure 5:
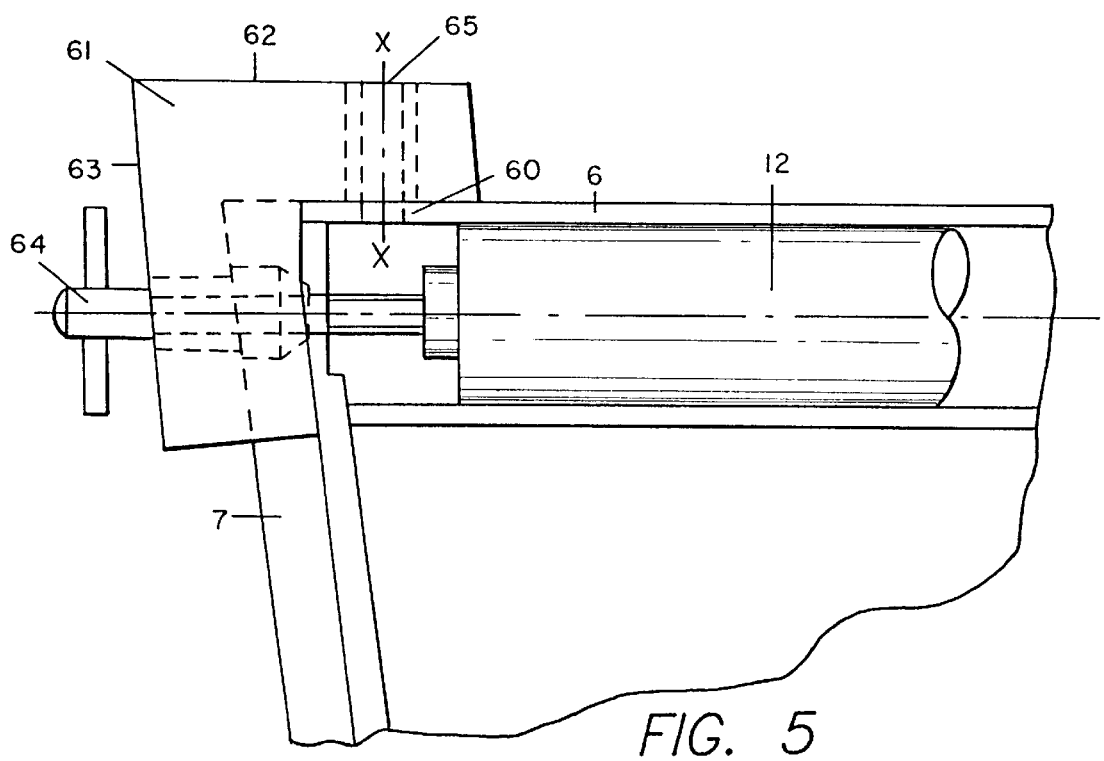
FIG. 5 is a view analogous to that of FIG. 4, showing how a template is put into place on the butt.

FIG. 5 shows the template 61 for drilling the hole 60 accurately in the butt 6 in the right place, i.e. on the axis XX of the hole 31 in the spacer 30.

The template 61 has a first limb 62 bearing against the rear top portion of the butt 6, and a limb 63 that is at an angle of less than 90° relative to the limb 62, matching the angle of the butt 6 in the location of its buttplate 7.

In FIG. 5, the existing spacer 14 (FIG. 2) has been removed and the template 61 has been placed on the rear top portion of the butt 6.

The assembly is screwed together using a tommy-bar screw 64 which takes the place of the screw 15 (FIG. 2). Once the template 61 has been fixed in place, a hole is drilled through the hole 65 which is itself preferably lined with a drilling bushing.

The hole 60 in the butt 6 thus gives access to the housing 31 of the supplied spacer 30.

After the template 61 has been removed, the buttplate 7 is put into place and secured by means of the screw 15, with this being done after the peg 20 has been put into place together with the two pins 25 which hold it in its housing 31 in the spacer 30.

Figure 7:
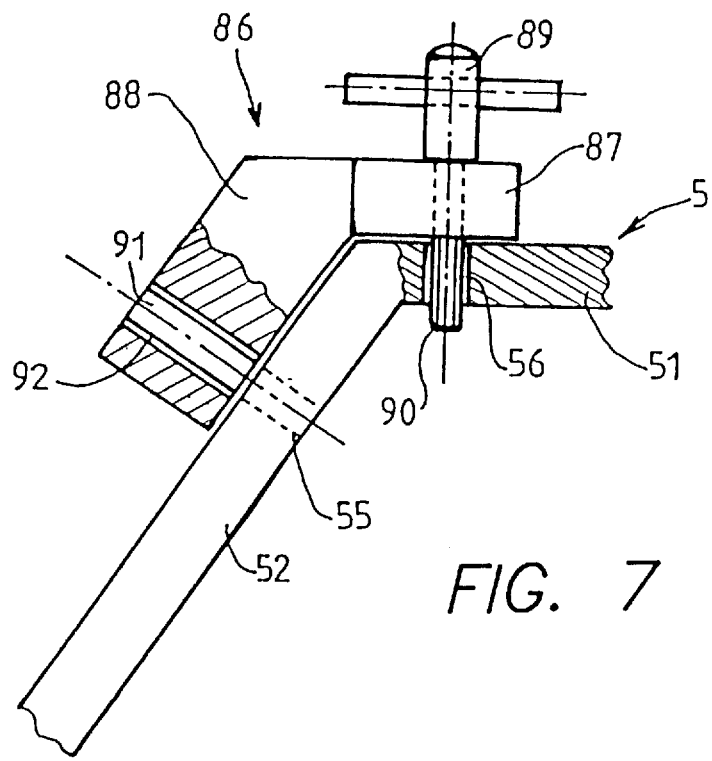
FIG. 7 shows how the template for drilling the rear limb of the foresight support is put into place.
Figure 6:
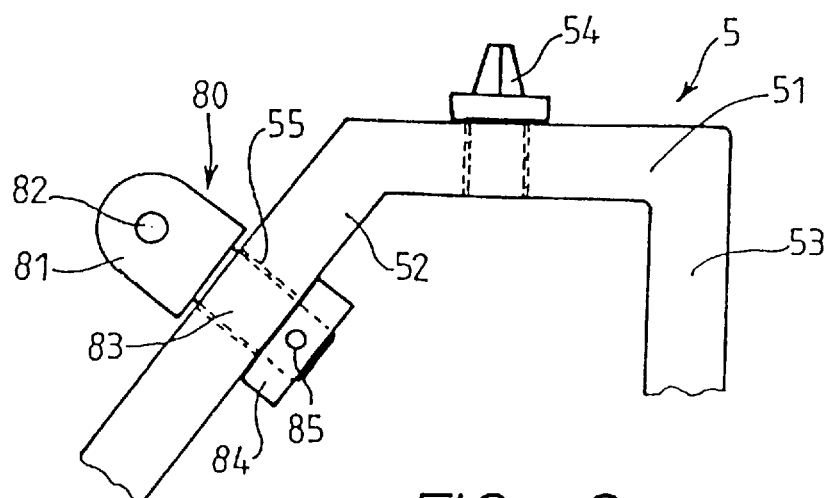
FIG. 6 is a fragmentary diagrammatic view of the rear limb of the foresight support and of the top limb thereof, showing the foresight and the installed swivel.

FIGS. 6 and 7 show the front swivel and the template for putting it into place.

In FIG. 6, which shows only a portion of the support 5 for the frontsight 54, the rear limb 52 is provided with a peg 80 having a head 81 including a hole 82 for attaching to the sling. The head 81 is extended by a shank 83, preferably a threaded shank, that passes through an orifice 55 formed in the limb 52 of the frontsight support. The shank 83 receives a nut 84 which is locked by a pin 85 placed in the threaded shank 83.

In FIG. 7, the hole 55 is drilled accurately by means of a template 86 having two limbs 87 and 88. The limb 87 bears against the top of the limb 51 of the frontsight support 5 while the limb 88 fits closely against the limb 52 of the support 5. The limbs 87 and 88 are thus parallel to the limbs 51 and 52.

The limb 87 is provided with a tommy-bar screw 89 whose threaded shank 90 engages in tapping 56 in the limb 51 for receiving the frontsight 54 (which is removed while this is taking place).

The limb 88 is provided with a drilling hole 91 having a bushing 92 for drilling the hole 55 in the limb 52 and enabling the peg 80 to be put into place as described with reference to FIG. 6.

Once the pegs 20 and 80 have been fixed to the firearm as described above, it is possible to attach the sling swivels thereto.

Figure 8:
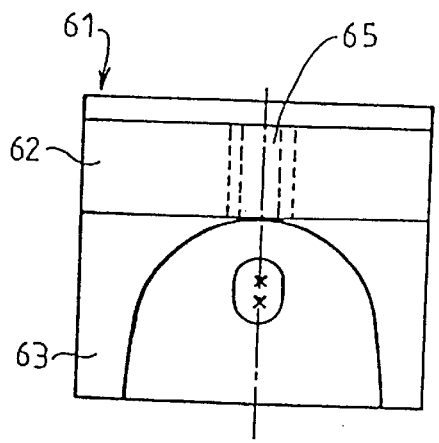
FIG. 8 is a front view of the rear template.
Figure 9:
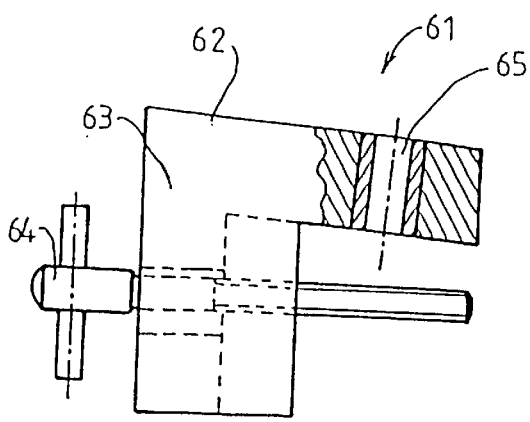
FIG. 9 is a side view of the rear template.

FIGS. 8 and 9 show the rear template 61 and show more clearly its structure which is not described again.

Figure 10:
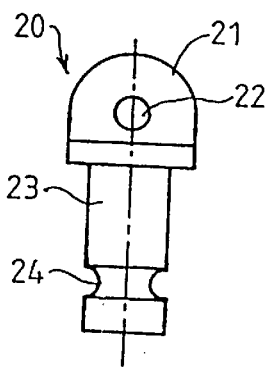
FIG. 10 is a side view of the peg for the rear template.
Figure 11:
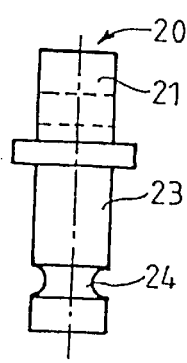
FIG. 11 is a front view of the peg for the rear sling swivel.

FIGS. 10 and 11 are two views of the peg 20 for the rear sling swivel on the butt. These figures show in particular the groove 24 formed in the shank 23 of the peg together with the special shape of the head 21 having the orifice 22 and an enlarged base.

Figure 12:
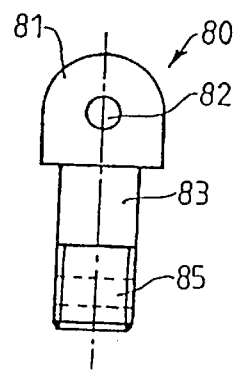
FIG. 12 is a side view of the peg for the frontsight support.
Figure 13:
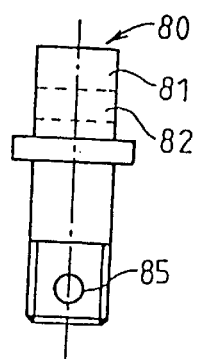
FIG. 13 is a front view of the FIG. 12 peg.

FIGS. 12 and 13 show the peg 80 with its shank 83 that is threaded and has a hole 85 for receiving the pin.

Figure 14:
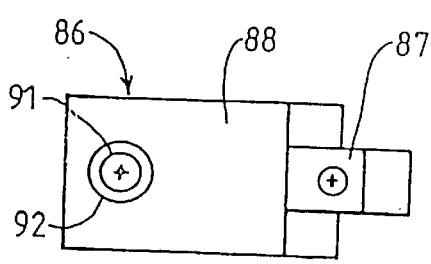
FIG. 14 is a plan view of the template for drilling the frontsight support.
Figure 15:
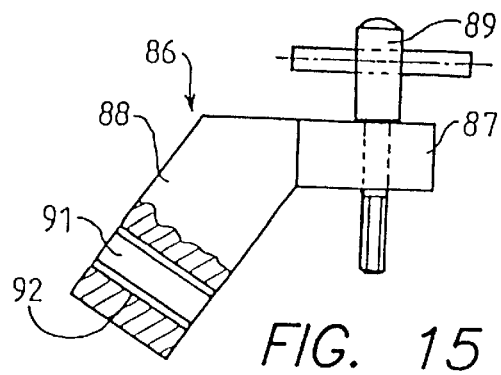
FIG. 15 is a side view of the template for drilling the frontsight support.

FIGS. 14 and 15 are respectively a plan view and a side view of the template 86. The plan view, in particular the tommy-bar screw 89 show the narrow shape of the limb 87 which fits against the limb 51 of the frontsight support 5, between the raised edges thereof which normally serve to protect the frontsight.

In contrast, the other limb 88 is of normal width corresponding substantially to the width of the limb 52 of the frontsight support 5.

I claim:

1. Sling-fitting equipment for an assault rifle of the AR15-M16 firearm family and equivalent models, comprising:

a rear fixing member for fixing to a butt and a front fixing member for fixing to a barrel, a frontsight being carried by a quadrilateral support fixed to the barrel;

the butt being engaged on a tube screwed to the body of the firearm, and being fixed to the tube by a screw passing through the buttplate;

wherein:

the rear fixing member comprises:

a peg having a head pierced to receive a sling-engaging loop;

the head bearing against the butt on top and on the outside; and the peg having a shank passing into the butt and being retained, free to rotate, in a retaining spacer carried by the rear end of the butt-support tube, between the tube and the buttplate;

the front fixing member being a peg fixed to the rear limb of the support for the frontsight, between the frontsight and the barrel, said member being constituted by a head having a hole for receiving the other sling swivel, and a threaded shank passing through the rear limb of the frontsight support, and receiving a nut secured by a pin.

2. Equipment according to claim 1, wherein the peg of the rear fixing member includes a groove in the portion of its shank which enters into the spacer and the spacer is provided with two holes for receiving two pins engaging in opposite sides of the groove to secure the peg to the spacer while allowing it to rotate about its own axis.

3. An assembly for putting into place the equipment according to claim 1, the assembly comprising:

an L-shaped rear template having one limb that fits over the rear of the butt and another limb inclined at less than 90° relative to the first at the same slope as the buttplate and provided with a hole coinciding with the tube so as to enable it to be installed and fixed against the tube in the place of the buttplate;

the first limb having a hole lined with a bushing through which the butt can be drilled to enable it to receive the shank of the peg.

4. An assembly for putting into place the equipment according to claim 1, the assembly comprising an L-shaped front template, matching the shape of the frontsight support for its top portion that receives the frontsight and its other limb that slopes like the rear portion of the frontsight support, said template being provided in its first limb with a tommy-bar screw for engaging in the tapped hole for the frontsight once the frontsight has been removed, the rear limb including a drilling bushing through which a hole can be drilled in the rear limb to enable the sling swivel peg to be installed.

* * * * *